United States Patent [19]

Dobler et al.

[11] 4,232,545

[45] Nov. 11, 1980

[54] APPARATUS FOR DETECTING PRESSURE FLUCTUATIONS IN THE COMBUSTION CHAMBER OF AN INTERNAL COMBUSTION ENGINE

[75] Inventors: Klaus Dobler, Gerlingen; Christian Zrenner, Stuttgart; Günter Schirmer, Ingersheim; Alfred Kizler, Stuttgart, all of Fed. Rep. of Germany

[73] Assignee: Robert Bosch GmbH, Stuttgart, Fed. Rep. of Germany

[21] Appl. No.: 2,478

[22] Filed: Jan. 10, 1979

[30] Foreign Application Priority Data

Jan. 19, 1978 [DE] Fed. Rep. of Germany ....... 2802202

[51] Int. Cl.³ .......................................... G01M 15/00
[52] U.S. Cl. ........................................ 73/35; 73/115; 123/425; 123/435
[58] Field of Search .................... 73/35, 116, 23, 115; 123/119 ED, 164

[56] References Cited

U.S. PATENT DOCUMENTS 2,543,141  2/1951  Vichnievsky ........................... 73/35

2,830,191  4/1958  McCollom et al. ................. 73/35 X

Primary Examiner—Jerry W. Myracle
Attorney, Agent, or Firm—Edwin E. Greigg

[57] ABSTRACT

An apparatus serving to detect pressure fluctuations in the combustion chamber of an internal combustion engine, including an ionic current sensor, which is exposed to the gases in the combustion chamber and comprises a first electrode and a second electrode, between which a measurement voltage is applied and between which a connecting channel extends from the open combustion chamber into a dead space. In this manner, ionic currents may be detected which are caused by fluctuating pressures in the combustion chamber, particularly when there is engine knocking. Particularly when the geometry of the dead space is adapted to the frequency of the pressure fluctuations which are to be measured, these pressure fluctuations can be detected independently of other, slower pressure variations in the form of a pulsating current which is large when the ion-carrying gas enters the dead space and small when this gas, by now strongly deionized, exits the dead space.

8 Claims, 11 Drawing Figures

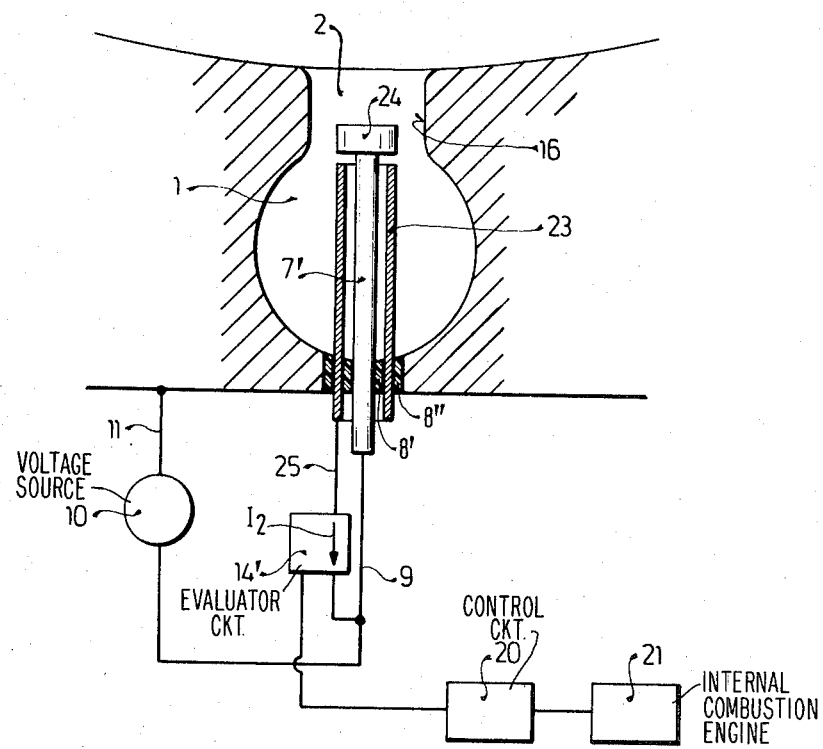
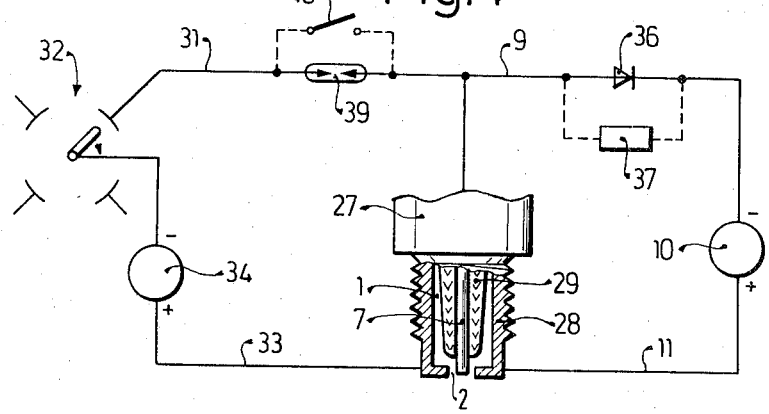

APPARATUS FOR DETECTING PRESSURE FLUCTUATIONS IN THE COMBUSTION CHAMBER OF AN INTERNAL COMBUSTION ENGINE

BACKGROUND OF THE INVENTION

The combustion chamber pressure is an important parameter which provides information on the progression of combustion in the combustion chamber of an internal combustion chamber. Variations of the instant of ignition, the mixture composition, and the mixture distribution have an effect on the progression of the combustion process in the engine and on the pressure which is generated therein. In particular, when control of the above parameters is unfavorable, engine knocking can occur, which is very disadvantageous for the operation and the life of the engine. There are also related effects on the composition of the exhaust gases and the efficiency of the engine.

The detection of knocking is thus of great interest in regulating the mixture composition and/or the instant of ignition. Detecting knocking with the aid of torque meters, acceleration meters or microphones is already known. However, such methods require frequency filters which permit the passage of a frequency which is specific for knocking. Knocking can not be extracted as a pure signal in this manner, but only as a derived signal.

The detection of knocking with the aid of an ionic current sensor is also known. It has thereby been ascertained that the output signal of the ionic current sensor has low and high frequency components and that the high frequency components increase virtually in uniformity with the intensity of engine knocking. The difficulty has been the separation of the low frequency ionic currents from the high frequency ionic currents which are specific for knocking. To this end, an RC high-pass filter was provided in the known apparatus, with a subsequent ammeter which indicates the average strength of the current of ionic current components which have been thus filtered out. However, this apparatus is very much dependent upon the mean effective has pressure prevailing in the combustion chamber.

OBJECT AND SUMMARY OF THE INVENTION

The principle object of the invention is to improve the means for detecting combustion chamber pressure fluctuations with an ionic current sensor.

The arrangement in accordance with the invention provides for detecting only the variations in pressure fluctuation as a pulsating ionic current.

A dead space is provided, and it is particularly advantageous that the geometry of the dead space is adapted to the frequency of the pressure fluctuations to be measured in such a way that an acoustic resonance occurs when there is excitation by pressure fluctuations having this frequency. By this means, the component of the pressure fluctuations which is caused by engine knocking is detected in a simple and secure manner. The frequency of these pressure fluctuations is substantially constant, so that over a wide operational range of the engine a signal can be extracted which, with a high degree of certainty, characterizes engine knocking.

By forming the electrodes of the ionic current sensor and associating them with one another in such a way that the lines of force between the two electrodes are substantially limited to a connecting channel between the dead space and the combustion chamber, an improved detection of ions is likewise obtained, where the ions are set in motion solely as a result of pressure fluctuations, and particularly of pressure fluctuations which are caused by engine knocking.

BRIEF DESCRIPTION OF THE DRAWINGS

FIG. 3 illustrates a second embodiment of the invention having a double center electrode of the ionic current sensor;

FIG. 4 illustrates schematically an ionic current measurement circuit where the ionic current sensor is simultaneously employed as a spark plug;

DESCRIPTION OF THE PREFERRED EMBODIMENTS

Figure 1:
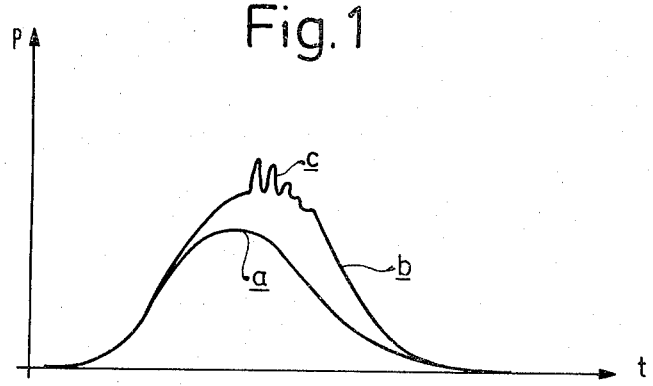
FIG. 1 is a diagram showing the profile of the pressure in the combustion chamber over a period of time in a knocking engine (b, c) and in a non-knocking engine (a)

FIG. 1 shows the distribution of the combustion chamber pressure as a function of time, that is, of the crankshaft rotary angle in the range of the compression and ignition of the operating mixture located in a combustion chamber. The curve a indicates the pressure distribution during non-knocking combustion and the curve b shows the pressure distribution during knocking combustion. The oscillating superimposition of pressure peaks, which are of high frequency compared with the normal pressure distribution, is characteristic for knocking combustion. In order to detect knocking, the pressure fluctuations c must be measured. The output signal can then be fed as a control value to a closed-loop control circuit.

Figure 2:
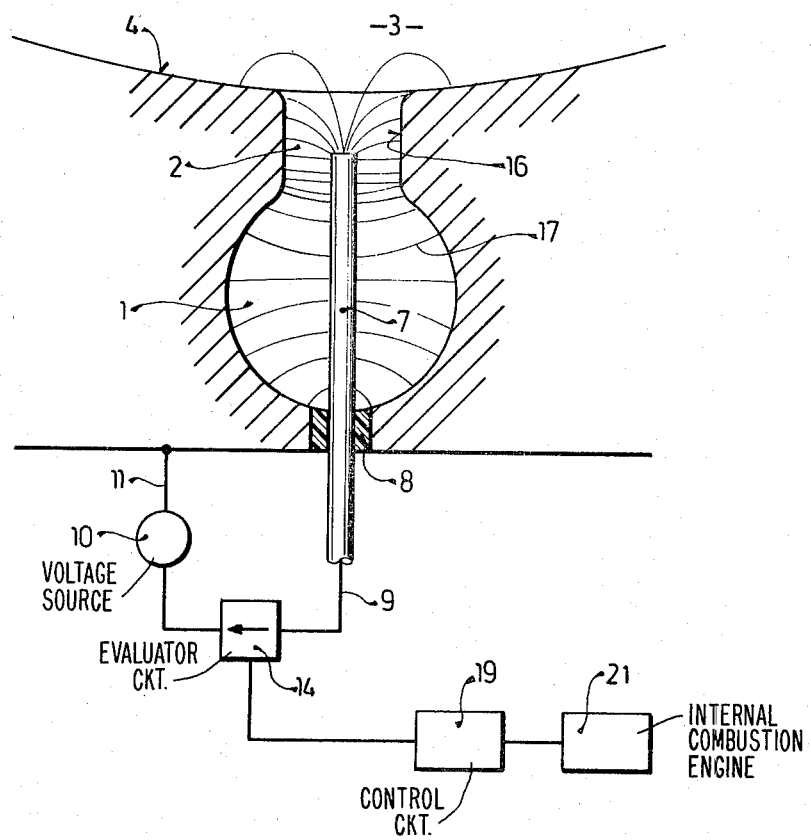
FIG. 2 illustrates a first embodiment of the invention.

In FIG. 2, an apparatus is shown with which it is possible to detect these high-frequency pressure fluctuations c as an ionic current. A dead space 1 is provided which communicates via a connecting channel 2 with the combustion chamber 3 of the internal combustion engine. Only a portion of the combustion chamber limiting wall 4, which includes within itself the dead space 1 and the connecting channel 2 is shown in the illustration. A first electrode 7 is disposed coaxially with the connecting channel 2 and extends out of the dead space 1 via an insulator 8 and is connected via a line 9 with a measurement voltage source 10. The first pole of this measurement voltage source 10, its positive pole, for example, is connected electrically via a line 11 to ground, that is, to the combustion chamber wall. An evaluator circuit 14 is provided in the line 9, which converts the ionic current flowing through the line 9 into a control signal which is utilizable by a closed-loop control circuit 19.

(x) This conversion is achieved, for example, as a voltage drop produced by the ionic current across a resistor. The ionic current oscillations will be filtered out and input to a comparator which then delivers the control signal.

A second electrode is substantially formed by the area 16 of the connecting channel 2. The rod-shaped first electrode 7 projects only partially into the connecting channel 2 and is thus somewhat retracted with respect to the open combustion chamber 3. The reference numeral 17 represents the lines of force which extend from the first electrode to the second electrode, and further represents the force field density. The first electrode 7 is disposed in such a way with respect to the second electrode 16, that the force field density is greatest in the area of the connecting channel 2. The lines of force which extend, for example, from the front face of the first electrode 7, reach outward through the connecting channel 2 and into the combustion chamber 3 to only a very limited extent.

As a result of this embodiment according to the invention, gases are set in motion and flow into the dead space 1 via the connecting channel 2 as soon as there are pressure variations in the combustion chamber 3 and the pressure rises. The gases flow out of the dead space 1 when the pressure in the combustion chamber 3 falls. Thus, oscillating gas currents arise in the connecting channel 2 which correspond to the pressure fluctuations in the combustion chamber 3.

After the operating mixture has been ignited in the combustion chamber 3 and ions have thus appeared, the above-mentioned oscillating gas currents transport these ions through the connecting channel 2. However, because of the applied electrical field, the ions of the entering gas are more or less firmly bound by the electrodes, so that the gas which then exits the dead space 1 is very low in ions. In this manner, a differentiating effect of the combustion chamber pressure distribution is obtained. It is substantially the high frequency fluctuations c which are detected, in the form of ionic currents which fluctuate in the same manner.

The ionic current itself is dependent on the degree of ionization, the pressure, or the ionic density and on the ratio of the gas velocity in the connecting channel 2 to the ionic drift velocity. Only those ions which can cover a sufficiently long drift path in the field between the two electrodes 7 and 16 reach an electrode and there give up their charge. When the force field is sufficiently strong, it is possible that all the ions may reach an electrode, even when the gas velocity is high, and it is thereby possible to obtain a maximum evaluatable current and the largest possible differentiation of the pressure fluctuations.

In this connection, it is further important that as few of the lines of force as possible extend from the first electrode 7 into the combustion chamber 3, otherwise the ions which are in turbulent motion there will also be detected, although they are not characteristic for pressure variations.

Since there are other components of the pressure fluctuations c from those which are exclusively caused by knocking, and since these other components have different causes, it is very advantageous to embody the volume of the dead space 1 as a resonant body responsive to the specific frequency of the pressure fluctuations which is characteristic of knocking. Thus, on the one hand the above-mentioned pressure fluctuations due to other causes are excluded, and on the other hand the evaluatable ionic current is increased by the increased gas velocities in the connecting channel 2. Such fluctuations which are not caused by knocking and which in general have a different frequency from that of the knocking fluctuations, since they are disturbing influences, may be separated out additionally by means of differentiation or filtering in an evaluator circuit 14. The typical differentiating and filtering circuits are disclosed in U.S. Pat. No. 3,872,846, the specification of which is incorporated herein. The control signal formed in the evaluator circuit 14 may then be fed to a closed-loop control apparatus 19, which influences the parameters which cause, or share in causing, knocking during combustion of the operating mixture in the combustion chamber. Possible parameters for this purpose are the instant of ignition and the mixture composition, as examples.

FIG. 3 illustrates a further embodiment of the ionic current sensor shown in FIG. 2. The first electrode here is embodied differently from that of FIG. 2, namely as a double electrode having a central electrode 7' and a third electrode 23, which coaxially surrounds the first, or central electrode 7' in the manner of a capillary tube. The first electrode 7' has a head 24 on its free end projecting into the connecting channel 2, which projects radially above the third electrode 23. The third electrode 23 ends at the entrance of the connecting channel 2 into the dead space 1, and, insulated from the first electrode 7' by the insulator 8', leads to the outside. As in the first embodiment, the electrode 7' is connected via the line 9 with the voltage source 10, which again is grounded via the line 11. Parallel to this, the third electrode 23 is insulated by the insulator 8'', and is also connected with the voltage source 10 via a line 25, which contains an evaluator circuit 14' which conducts a control signal to the closed-loop control circuit 20, from whence the selected parameters of the internal combustion engine 21 are influenced.

The ions which appear only at low gas velocities, which correspond to non-knocking combustion, are drawn off by means of the head 24 of the first electrode 7' which is located in front of the third electrode 23. Only at higher gas velocities, corresponding to high frequency pressure fluctuations during knocking combustion, do ions also reach the third electrode 23, so that the ionic current I2 which appears there is a direct measure for knocking, via the line 25. The evaluator circuit 14' can accordingly be more simply designed.

A particularly advantageous arrangement is obtained when the spark plug, which serves to ignite the operating mixture introduced into the combustion chamber of the internal combustion engine, is itself employed as an ionic current sensor. Then it is also advantageous that there is no need to provide an additional bore in the cylinder head. Such an arrangement is schematically shown in FIG. 4. There the central electrode of the spark plug 27 serves as the first electrode 7, and the spark plug housing 28 serves as the second electrode. The space between the spark plug insulator 29 and the housing 28 is embodied as a dead space 1. The electrodes 7 and 28, as in the first embodiment, are connected via lines 9 and 11 with a measurement voltage source 10. The central or first electrode 7 is further connected via a line 31 with the ignition distributor 32 of the engine and lies with its negative pole at the ignition voltage source 34. The spark plug housing 28, for its part, is connected via a line 33 with the positive pole of the ignition voltage source 34. In order to provide separation of the measurement voltage circuit and the ignition voltage circuit, there is provided a diode 36 and/or a high ohmic resistor 37, poled in the direction of ionic current flow, disposed on one side in the line 9, as is shown in broken lines in FIG. 4. On the other side, the ignition voltage circuit contains a pre-spark gap 39 in the line 31, which, however, may also be replaced by a switch 40, as is also shown in broken lines in FIG. 4. Since, however, series-connected spark gaps are frequently built-in for the purpose of stabilizing the ignition, this spark gap for the purpose of separation will be understood to be a very advantageous embodiment. With this arrangement, naturally an ionic current can only first be measured after the ignition process has terminated, which, however, does not affect the precision of the ionic current detection. An impermissible loading of the ignition circuit is prevented by the diode 36 and/or the resistor 37.

The spark plug represents a sturdy transducer element, whereby the ignition hinders the depositing of combustion residues which would act as insulation and also would hinder reception of ionic current. However, a conventionally formed spark plug is only, in exceptional cases, suited for sufficiently precise measurement of the ionic currents caused by the appearance of knocking. As was already described in connection wth FIG. 1, it is all the more disadvantageous for ionic current measurement, the more lines of force there are extending into the open combustion chamber and thus trapping ions there, which are then delivered to the electrodes as a result not solely of the pressure fluctuations. On the other hand, a recessed electrode such as that of the embodiment of FIG. 1, furnishes very poor conditions for a trouble-free ignition of the fuel-air mixture in the combustion chamber. In the embodiments of FIGS. 5–11 accordingly, ionic current sensors are illustrated which are sufficiently suited for both purposes.

Figure 5:
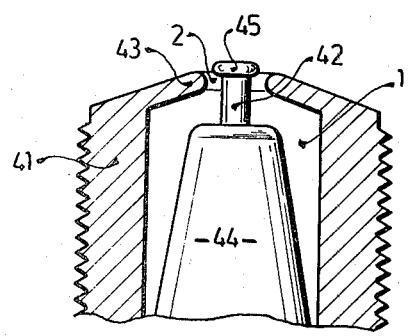

FIG. 5 illustrates an ionic current sensor embodied as a spark plug, which has a spark plug housing 41 as the second electrode, which is annularly recessed at the tip of a central electrode 42 serving as the first electrode. Between the annularly recessed portion 43 of the spark plug housing 41 and the central electrode 42, the connecting channel 2 is formed. The space between the spark plug housing 41 and the spark plug insulator 44 surrounding the central electrode 42 is embodied as a dead space 1. By shaping the spark plug housing and the spark plug insulator appropriately, special resonator properties can be obtained in this space. The central electrode 42 ends flush with the annularly recessed portion 43 of the spark plug housing and is shielded at the front face from the combustion chamber by an insulating layer 45. This insulating layer 45 has a limited transverse conductive capacity for charge carriers and, as soon as charge carriers have attached themselves there, furnishes a shielding of the electrical field from the combustion chamber, so that the electrical field is predominantly formed between the central electrode and the annularly recessed portion 43 of the spark plug housing.

Figure 6:
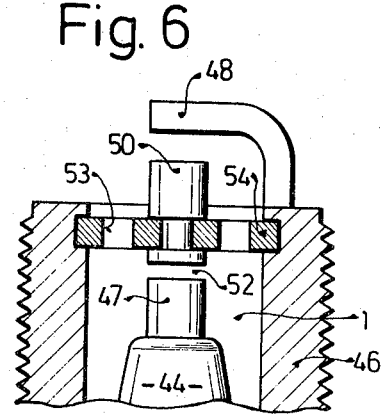
FIGS. 5-11 are partial views of further embodiments of the invention where the ionic current sensor is simultaneously employed as a spark plug.

FIG. 6 illustrates a further advantageous type of embodiment of an ionic current sensor serving as a spark plug. Here, the ionic current sensor when seen from the outside is embodied like a conventional spark plug. A right-angled, hook-like electrode 48 extends from the front face of the spark plug housing 46 and is curved toward the axis of the central electrode. This electrode 48 represents the conventional ground electrode of the spark plug.

The conventional central electrode of the spark plug, which is surrounded by the spark plug insulator 44, is, in this embodiment, divided into a measurement electrode 47 and an ignition electrode 50. The ignition electrode 50 is associated with the ground electrode 48 and there is a gap between them, across which the ignition spark is intended to jump. In the embodiment according to FIG. 6, the ignition electrode 50 is separated from the measurement electrode 47 by a second pre-spark gap 52. The ignition electrode 50 is supported by a holder 54 which is inserted into the spark plug housing 46 and has openings 53 to provide communication with the dead space 1. The second pre-spark gap 52 is designed for a low spark voltage, so that when the ignition voltage is applied to the spark plug electrodes, the spark already jumps the gap at low voltages and the main ignition spark appears between the ignition electrode 50 and the ground electrode 48. Then, in the combustion chamber, this ignition spark ignites the fuel-air mixture in the usual manner. However, if only the lower measurement voltage is present at the central electrode 47, 50, in accordance with the circuit diagram of FIG. 4, then the ignition electrode 50 remains electrically separated from the measurement electrode 47. The force field which then forms extends substantially only within the dead space 1. The measured ionic currents then result only from ions which are introduced into the dead space 1 through the openings 53, as a result of gas motions caused by pressure fluctuations.

Figure 9:
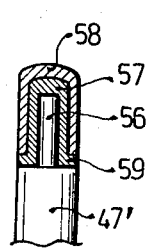
Figure 10:
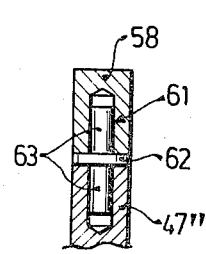
Figure 11:
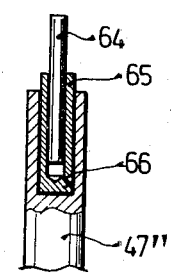

Other embodiments of the ignition electrode 50 and its mounting are shown in FIGS. 9–11. In the embodiment of FIG. 9, the measurement electrode 47' has a tang 56, which is covered by a cap 57 of insulating material such as ceramic. On top of the cap 57 there is a second cap 58 of electrode material which acts as the ignition electrode. This cap may be, for example, spray-molded on and has the necessary end diameter of the ignition electrode. There is an insulating intermediate ring 59 between the ignition electrode 58 and the measurement electrode 47'. The intermediate ring 59 is a component of the insulating cap 57 and determines the size of the second spark gap by its thickness. As a result of this structure, the pre-spark at the upper surface of the measurement electrode 47' jumps over onto the ignition electrode 58. In this manner, the upper surfaces are cleaned of possible dirt, and in particular the upper surface of the intermediate ring 59 is cleaned, so that a good electrical separation of the two electrodes is always accomplished.

The embodiment according to FIG. 10 substantially corresponds to that of FIG. 9. However, here the ignition electrode 58 is connected with the measurement electrode 47" by a separation body 61 of insulating material, which at both sides of a bond 62 has a tang 63 inserted into a blind bore in the ignition electrode 58 and the measurement electrode 47".

In the embodiment of FIG. 11, the ignition electrode is inserted as a narrower pin 64 into an insulating body 65, which for its part is seated in a blind bore 66 on the front face of the measurement electrode 47". Compared with the measurement electrode 47", the insulating body projects somewhat further outward and its dimensions define the spacing of the second pre-spark gap. The insulating parts in the above embodiments are of such dimensions that they heat up during the operation of the spark plug (that is, the ionic current sensor) to a temperature at which the conductive deposits, especially those on the insulating body, are burned off, insofar as this does not take place by means of the moving spark at the second pre-spark gap.

Figure 7:
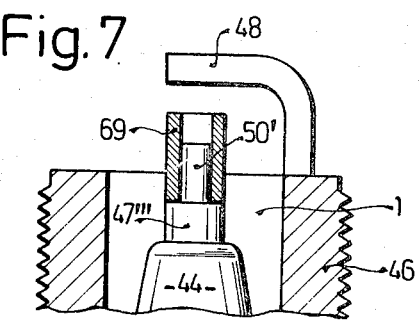

In the embodiment according to FIG. 7 as well, the ionic current sensor has the conventional housing 46 of a spark plug. As in the embodiment of FIG. 6 the conventional hook-like ground electrode 48 is provided, bending toward the central electrode. However, in this embodiment, the subdivision into measurement electrode 47''' and the ignition electrode 50' is accomplished in such a way that the ignition electrode 50' is a tang seated on the measurement electrode 47''' and surrounded by a tube 69 of insulating material. The tube 69 advantageously projects somewhat above the ignition electrode 50' and thus is closer to the ground electrode 48. The strength of the field between the ignition electrode 50' and the ground electrode 48 is increased as a result of the sharp edges of the insulating tube 69, and the voltage at which a spark jumps the gap is thereby lowered. Furthermore, the upper surface of the tube 69, which has charge carriers occupying it, shields the electrical field from the combustion chamber so long as the spark plug serves as an ionic current sensor, so that the electrical field which provides the standard for the generation of an ionic current extends substantially radially from the measurement electrode 47''' to the spark plug housing 46. An ionic current which would be caused by the pairing of ignition electrode 50' and the tube 69 with the ground electrode 48 will flow only until such time as the upper surface of the insulating tube 69 is so heavily occupied by charge carriers that, as a result of the reduction in the strength of the field which is thus brought about, no further ionic current can flow onto the recessed front face of the ignition electrode 50'.

Figure 8:
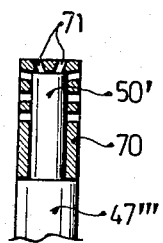

The same effect is obtained by an arrangement such as that shown in FIG. 8. Here, the entire upper surface of the tang-like ignition electrode 50', which is narrower than the measurement electrode 47''', is surrounded by an insulating cap 70, which has a plurality of openings 71, or is of entirely porous nature. The ignition spark can jump through the openings 71 in the same manner as in the embodiment of FIG. 7. During the measurement of ionic current, the upper surface of the insulating layer, occupied by charge carriers, shields the field from the combustion chamber. Here, as well, the measurement electrode 47''' is retracted with respect to the front face of the spark plug housing 46 within the dead space 1, and the field required for trapping the ions then extends substantially radially between the spark plug housing 46 and the jacket surface of the measurement electrode 47'''. Naturally further possibilities can be provided by other means at more or less expense for limiting the electrical field, which extends from the measurement electrode, as much as possible to the dead space, and still further to connecting portions between the dead space and the combustion chamber, where high gas velocities appear which change direction in accordance with the pressure fluctuations in the combustion chamber.

The foregoing relates to preferred embodiments of the invention, it being understood that other embodiments and variants thereof are possible within the spirit and scope of the invention, the latter being defined by the appended claims.

What is claimed and desired to be secured by Letters Patent of the United States is:

1. In an apparatus for detecting pressure fluctuations in the combustion chamber of an internal combustion engine, comprising:
    an ionic current sensor mounted to the engine for exposure to the gas in a combustion chamber, said ionic current sensor including: means defining a dead space and a connecting channel which extends between the dead space and the combustion chamber; a first electrode; and a second electrode spaced from the first electrode, between which electrodes a measurement voltage is applied, wherein said connecting channel also defines the spacing between the first and second electrodes.

2. In the apparatus as defined in claim 1, wherein the spatial embodiment of the dead space is adapted to the frequency of the combustion chamber pressure fluctuations to be measured, in such a way that resonance is achieved when the pressure fluctuations have a frequency which is specific for knocking.

3. In the apparatus as defined in claim 1, wherein the first and second electrodes are formed and associated with each other in such a way that the lines of force extending between both electrodes are substantially limited to the connecting channel.

4. In the apparatus as defined in claim 3, wherein the first electrode is rod-like and is disposed coaxially to the axis of the connecting channel, and wherein the second electrode is formed by means of a wall by the means defining the connecting channel.

5. In the apparatus as defined in claim 1, further comprising:
    an evaluator circuit electrically connected to the ionic current sensor; and
    a closed-loop control circuit electrically connected to the evaluator circuit, wherein the current detected by the ionic current sensor is converted into a control signal by the evaluator circuit, and wherein the closed-loop control circuit receives the control signal for controlling parameters which influence knocking during combustion.

6. In the apparatus as defined in claim 5, wherein the evaluator circuit includes a differentiating apparatus for separating ionic current variations which are specific to knocking from ionic current variations which are not.

7. In the apparatus as defined in claim 5, wherein the evaluator circuit includes a filtering apparatus for separating ionic current variations which are specific to knocking from ionic current variations which are not.

8. In the apparatus as defined in claim 5, wherein the evaluator circuit includes differentiating and filtering apparatuses for separating ionic current variations which are specific to knocking from ionic current variations which are not.

* * * * *